United States Patent [19]
Carr

[11] Patent Number: 5,615,223
[45] Date of Patent: Mar. 25, 1997

[54] PPM DECODER UTILIZING DROP-OUT LOCATION INFORMATION

[75] Inventor: Thomas D. Carr, Leucadia, Calif.

[73] Assignee: Eastman Kodak Company, Rochester, N.Y.

[21] Appl. No.: 424,913

[22] Filed: Apr. 19, 1995

[51] Int. Cl.$^6$ ........................................ H03M 5/04
[52] U.S. Cl. ......................... 371/65; 371/57.1; 360/46; 375/239; 375/224
[58] Field of Search ............... 371/65, 57.1, 57.2, 371/61, 62, 42, 46, 47.1, 48; 360/38.1, 13, 42, 46, 53; 327/18, 30, 37, 47; 341/183, 111, 127, 132, 143; 375/340, 224, 226, 239, 241, 242; 395/185.08, 185.04; 358/336; 340/146.2

[56] References Cited

U.S. PATENT DOCUMENTS

| | | | |
|---|---|---|---|
| Re. 33,665 | 8/1991 | Ogawa | 369/33 |
| 3,629,823 | 12/1971 | Cseralkowski | 340/146.1 |
| 3,715,738 | 2/1973 | Kleist et al. | 360/13 |
| 3,840,892 | 10/1974 | Hayashi | 360/53 |
| 4,025,917 | 5/1977 | DuBrul | 340/347 DD |
| 4,353,130 | 10/1982 | Carasso et al. | 375/114 |
| 4,449,222 | 5/1984 | Crossett, III et al. | 375/10 |
| 4,603,357 | 7/1986 | Ramirez et al. | 360/46 |
| 4,613,769 | 9/1986 | Gross et al. | 307/351 |
| 4,964,139 | 10/1990 | Wash et al. | 375/23 |
| 4,977,419 | 12/1990 | Wash et al. | 354/76 |
| 5,020,057 | 5/1991 | Taniguchi et al. | 370/102 |
| 5,089,821 | 2/1992 | Mori | 341/155 |
| 5,105,316 | 4/1992 | Cronch et al. | 360/46 |
| 5,111,485 | 5/1992 | Serack | 375/112 |
| 5,136,591 | 8/1992 | Krause | 371/20.4 |
| 5,148,291 | 9/1992 | Kimura et al. | 358/336 |
| 5,199,007 | 3/1993 | Okano | 371/62 |
| 5,293,369 | 5/1994 | Melas et al. | 369/59 |
| 5,301,207 | 4/1994 | Emerson et al. | 375/10 |
| 5,313,236 | 5/1994 | Izukawa | 354/106 |
| 5,345,216 | 9/1994 | Chopra et al. | 340/146.2 |
| 5,455,720 | 10/1995 | Norton | 360/46 |

*Primary Examiner*—Robert W. Beausoliel, Jr.
*Assistant Examiner*—Phung My Chung
*Attorney, Agent, or Firm*—William F. Noval

[57] ABSTRACT

A method of and apparatus for decoding data from positive and negative pulses of an encoded pulse train, e.g. a NRZ pulse train for PPM encoding, wherein the recorded data is subject to drop-outs and drop-ins. Data bits are decoded from valid positive and negative pulses exceeding positive and negative peak pulse thresholds. Drop-outs are identified in the encoded pulse train as a function of read out positive and negative pulse magnitudes not exceeding positive and negative thresholds, and drop-out flags are provided in lieu of the respective positive and negative pulses. Decoded data bit signs are stored in memory locations, and drop-out flags are stored in memory locations in relation to the stored data bit signs such that the beginning and/or end of a drop-out in the encoded pulse train is indicated. Drop-out flags are also stored in response to the occurrence of two successive valid positive pulses or two successive valid negative pulses in the pulse train. Additionally, drop-out flags are stored in response to the time out of an interval between successive positive or negative pulses. The drop-out flag may also be stored in a memory location in relation to the preceding decoded data storage location such that the last valid data prior to the beginning of the drop-out in the encoded pulse train is indicated.

18 Claims, 8 Drawing Sheets

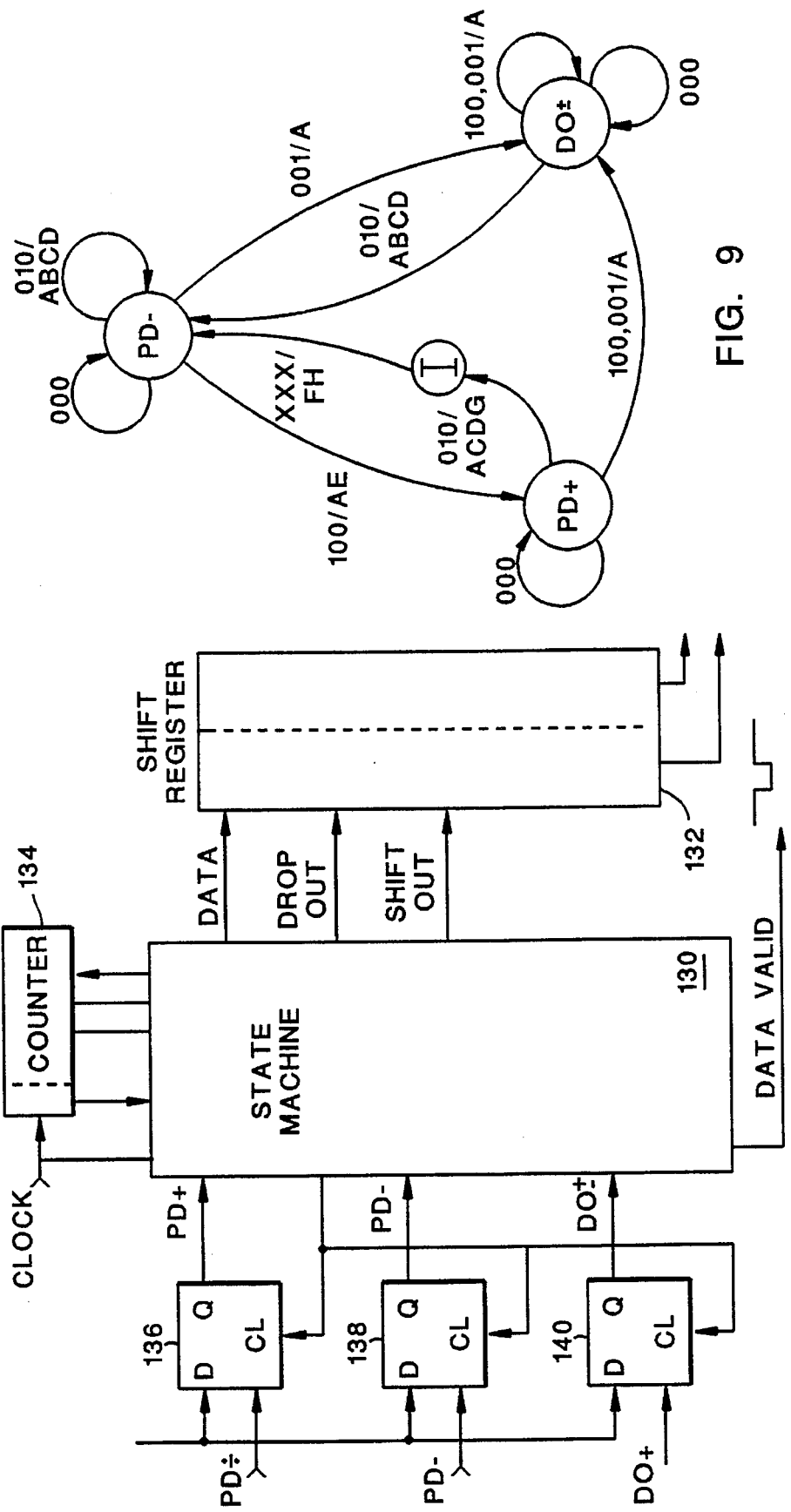

PPM DECODER UTILIZING DROP-OUT LOCATION INFORMATION

CROSS-REFERENCE TO RELATED APPLICATION

Reference is hereby made to commonly assigned, copending U.S. patent application Ser. Nos.: (Docket 70850) 08/424,916 filed Apr. 19, 1995, in the name of Thomas D. Carr and entitled DROP-OUT LOCATION DETECTION CIRCUIT.

FIELD OF THE INVENTION

This invention relates to electrical circuits suitable for decoding binary information from analog signal and clock patterns read out of a storage media, and particularly to such circuits for locating drop-outs in the recorded analog signal patterns.

BACKGROUND OF THE INVENTION

Magnetic recording stores information in a hard magnetic layer of a magnetic medium by setting the direction of magnetization of regions of the layer. A recording apparatus of the type using a magnetic disk, magnetic tape or similar magnetic recording medium, reproduces stored digital data in the form of an analog waveform representative of transitions of magnetic polarity on the recording medium. In the case of data recorded in an NRZ (non-return to zero) or NRZI (non-return to zero inverted) recording pattern, for example, positive and negative peaks follow one another in succession with transitions between the peaks passing through the signal baseline. Depending on the code used, the positive and negative peaks may represent explicit data bit values, in self-clocking codes, or may represent explicit clock bits and encoded data bits in pulse position or interval modulation codes. One form of a digital data reproducing circuit for reading any such recorded code differentiates the reproduced waveform and determines the points where the differentiated waveform crosses a zero level representative of zero AC volts, to detect the peaks.

In commonly assigned U.S. Pat. No 4,977,419, to Wash et al., a photographic filmstrip having a virtually transparent, magnetic film layer covering the non-emulsion side of the filmstrip (referred to as an MOF layer) is disclosed in conjunction with various camera systems. Potential longitudinal recording tracks are illustrated in the MOF layer in both the image frame area and on either side of the image frame area for recording information such as film type, film speed, film exposure information and information relevant to the processing and subsequent use (e.g., printing) of the exposed image frames. The systems disclosed therein provide for recording of information during film manufacture, reading and/or recording of information on certain tracks during camera use, and reading and/or recording of printer related information during photofinishing.

Novel methods for modulating the binary data or information into a format suitable for recording and reproducing in such tracks in the camera shown in the '419 patent are disclosed in commonly assigned U.S. Pat. No. 4,964,139, also to Wash et al. Two self synchronizing PPM coding methods are disclosed in the '139 patent, as the "Wash encoded signal" and the "Chi encoded signal" methods. Both PPM encoding methods have similarities as pointed out in the '139 patent, and the Wash encoded signal method is further referred to herein for purposes of explaining how the present invention may be practiced in at least one of its preferred embodiments in locating drop-outs in magnetically recorded data encoded in such a manner.

An example of the Wash encoding method, as used to record data in bit streams in the MOF layer tracks described in the '419 patent, is shown in FIG. 1 which essentially reproduces FIG. 3 of the '139 patent. In FIG. 1A), two successive bits 0 and 1 are position encoded in the two corresponding "interval or information-cells" as positive going data signal level transitions bounded by negative going clock signal transitions between the directions of magnetization. The Wash self-clocking bit code is effected by the position of the positive going data signal level transition in the information-cell. If it is positioned within the first half of the duration of the information-cell, then a data bit 0 is recorded. Similarly, a data bit 1 is recorded by positioning the data transition in the second half of the information-cell. As an aside, it should be noted that the data bit may in fact be a parity bit, as the two terms are used below.

Note that the encoding of the information or data transitions for both the first and second information-cells leaves invariant the clock transitions. With this self-clocking code, film transport velocity can vary during recording and playback without affecting the ability to synchronize and read the recorded data. As a result, the information-cells may lengthen or shorten depending on the filmstrip velocity, but the relative position of the data transitions can still be decoded. Thus, the camera disclosed in the '419 patent, for example, may record data in the MOF layer tracks while winding the filmstrip between exposures without imposing any velocity controls or recording an independent clock track. In fact, large amounts of jitter in the camera transport at frequencies at or near the data frequencies precludes the use of a phase-locked loop in generating a clock during magnetic signal read out.

The PPM information-cells are decoded by means of a head sensitive to the field or rate of change of the flux emanating from the polarized regions at the transition zones. The signal produced by most magnetic reproduce heads is a voltage pulse corresponding to the location of a transition zone from one magnetically set region to another. The detection circuitry to which the head is attached must determine the location of one peak relative to another. This is most often done by differentiating the pulse and comparing the voltage to zero. The differentiated waveform will cross zero at a time corresponding to the peak in the original waveform, at which point the comparator will change state. This works well in the region where the pulse has energy. However, outside this region, the input to the comparator hovers around zero, crossing zero as a result of noise, producing transitions at the output. To remedy this, the output of the comparator is gated by a circuit which only allows the comparator state to change when the input waveform exceeds a threshold, usually 30%–45% of the peak amplitude. This scheme works well in eliminating the unwanted transitions. A side effect is that, if the peak amplitude of the input signal fails to reach the threshold, no transition will occur and the data will be missed. Hard disk drives deal with this problem by marking locations on the disk where this occurs and not using the areas. Tape drives use frequent re-synching, read-while-write, re-reading, and powerful error correction code (ECC) to deal with the problem. Simple, inexpensive systems for use in cameras cannot use such complex and expensive solutions, and resort is therefor made to the self clocking PPM coding of Wash or Chi.

As shown in FIG. 1B, the data and clock transitions are read out as positive and negative going spike signals at the transitions. Turning to the read circuit 10 of FIG. 2, reproduced from the '139 patent, a read/write magnetic head 12 provides the read signals of FIG. 1B on lines 14. A pre-amplifier 16 amplifies the output signal from the magnetic head 12 and applies the amplified signal on lines 26 to a filter 18 for removing an unnecessary component from the amplified read signals. A post-amplifier 20 amplifies the filtered read signals and applies the filtered and amplified, positive and negative, signals to a peak detector 24 via line 22. In detector 24, the signals are applied to a positive peak detector (NPD) 30 and a negative peak detector (PPD) 32 for detecting the negative and positive pulses having amplitudes exceeding respective threshold levels to ensure that noise signals are not decoded as data or clock signals. Uniform amplitude, polarity, and pulse width, clock and data, signal pulse trains are thereby generated on lines 38 and 34 as depicted in FIG. 1C. A delay circuit 40 is connected to the NPD 32 via line 38, resulting in a delayed clock pulse train on lines 46 and 48 and also appearing in FIG. 1C.

The delayed clock signal is applied to the set terminal of the flip-flop 36 and is also applied to clear the up/down counter 50. The data signal is applied to the clear terminal of the flip-flop 36, so that the flip-flop 36 is set by delayed clock signals and cleared by data signals to provide the square wave signal shown in FIG. 1D at the Q output. The Q output is set high by a delayed clock signal and low by the succeeding data signal.

During the high state, the up/down counter 50 counts system clock 56 pulses applied to its CLK input, incrementing the count when the Q output is high and decrementing the count when the Q output is low. The most significant bit (MSB) of the output count of the up/down counter 50 and the CLOCK output from the NPD 32 are supplied to a computer 42. The particular manner of determining the data bit in the information-cell is further explained in the '139 patent.

Because of the pulse position modulation, variation in velocity of the filmstrip during recording or readout (within reasonable bounds in which a camera would be specified to operate) does not effect the accuracy of the data, as described above. However, the compliance of the magnetic record/reproduce head with the low density MOF layer during recording or reproducing the recorded data itself may be faulty for other reasons leading to a failure to either read or write data in one or more of the information-cells.

When compliance with the magnetic head is lost due to a dirt speck on the magnetic medium or curl of the medium or jitter in the head suspension or if the magnetic recording medium has a defect such as a change in the density of the magnetic powder or if electrical noise is introduced in a playback system from outside the system, false data generally referred to as a "drop-in" and/or the omission of data generally referred to as a "drop-out" can occur in the reproduced data stream. As described above with respect to FIG. 2, the conventional data read out circuit compares the absolute positive and negative amplitudes of the reproduced analog waveforms to threshold levels in the PPD and NPD circuits to convert, among the above-mentioned peaks, only the peaks having amplitudes higher than a predetermined threshold level into digital signals, determining that they are data bits 1 or 0 depending on their position in the case of the PPM encoded signals. Thus, if the amplitudes of the pulse signals fade below the thresholds, both the clock pulses separating successive information-cells and the data pulses signifying the binary data content can be lost.

The information-cells are recorded in a pattern of multi-bit bytes described in detail in the '419 patent, particularly in regard to FIGS. 6–9 thereof. A simplification of that format appears as follows in table I:

| Original Data | | | | | | | |
|---|---|---|---|---|---|---|---|
| $P_1$ | $d_{11}$ | $d_{12}$ | $d_{13}$ | $d_{14}$ | $d_{15}$ | $d_{16}$ | $d_{17}$ |
| $P_2$ | $d_{21}$ | $d_{22}$ | $d_{23}$ | $d_{24}$ | $d_{25}$ | $d_{26}$ | $d_{27}$ |
| $P_3$ | $d_{31}$ | $d_{32}$ | $d_{33}$ | $d_{34}$ | $d_{35}$ | $d_{36}$ | $d_{37}$ |
| P | P | P | P | P | P | P | P |

A block of three data bytes of eight information cells is shown. The first bit of each byte is a parity bit ($P_i$), and the remaining seven bits are data bits ($d_{i1}$–$d_{i7}$). Each block of bytes recorded serially in a single track in the MOF layer is separated by a parity byte, called a Longitudinal Redundancy Check (LRC). Each vertical bit value of the LRC is calculated from the values of the data bits in its respective column. The data bits of successive information-cells in each block are thereby protected with a 2-dimensional, horizontal and vertical, parity check in the data blocks. This scheme is able to correct an odd number of bits in error in any one byte, provided a bit is present at every position and the LRC is present in its proper position with the longitudinal parity bits lined up with their respective columns.

The PPM encoding method described above incorporates the clock information in with the data so that a drop-out typically results in both loss of data content and loss of the clock signal. When a drop-out occurs, no clock is available to transmit data from the decoder to the memory, so that bits are completely missing in the recovered data block. This results in loss of byte synchronization and renders the parity checks useless in recovering the uncorrupted data. Shown below in table II is the situation after recovery when bits are lost:

| Corrupted Data | | | | | | | |
|---|---|---|---|---|---|---|---|
| $P_1$ | $d_{11}$ | $d_{12}$ | $d_{13}$ | $d_{14}$ | $d_{15}$ | $d_{16}$ | $d_{17}$ |
| $P_2$ | $d_{21}$ | $d_{22}$ | $d_{23}$ | $d_{24}$ | $P_3$ | $d_{31}$ | $d_{32}$ |
| $d_{33}$ | $d_{34}$ | $d_{35}$ | $d_{36}$ | $d_{37}$ | P | P | P |
| P | P | P | P | P | X | X | X |

A drop-out of three information-cells and the respective data bits $d_{25}$, $d_{26}$, $d_{27}$, occurred in the second row, causing the data bytes and the LRC parity bits to shift in the recovered block. No correction is possible because of this, and the data read out may either be thwarted or the data may be misinterpreted. It should be understood that in practice, the problem is magnified by the number of bytes in the data set and the location of the drop-out in the series of bytes.

SUMMARY OF THE INVENTION

It is therefore an object of the present invention to provide a system for flagging the occurrence and the position of a drop-out in a data bit stream of a data block.

In accordance with the invention, a method of and apparatus for decoding data from positive and negative pulses of an encoded pulse train, wherein the recorded data is subject to drop-outs and drop-ins, comprises the steps of and means for: providing positive and negative peak pulse thresholds; comparing the magnitudes of positive and negative pulses to the positive and negative peak pulse thresholds; decoding data bits from valid positive and negative pulses exceeding the positive and negative peak pulse thresholds; identifying drop-outs in the encoded pulse train as a function of read out positive and negative pulse magnitudes not exceeding the positive and negative thresholds and providing drop-out flags in lieu of the respective positive and negative pulses; storing decoded data in memory locations; and storing the drop-out flags in memory locations in relation to decoded data such that the beginning and/or end of a drop-out in the encoded pulse train is indicated.

The identifying step and means preferably further comprises the additional step of and means for identifying drop-outs or drop-ins in the encoded pulse train in response to the occurrence of two successive valid positive pulses or two successive valid negative pulses in the pulse train.

Moreover, the identifying step and means may further comprise the steps of and means for: timing out the interval between successive valid positive or negative pulses; providing a reference interval; comparing the timed out interval to the reference interval; and identifying drop-outs in the encoded pulse train in response to the timed out interval exceeding the reference interval.

The drop-out flag storing step and means preferably further comprises the steps of and means for: identifying the preceding data stored decoded data location in memory; and storing the drop-out flag in a memory location in relation to the identified preceding decoded data location such that the last valid data prior to the beginning of the drop-out in the encoded pulse train is indicated.

ADVANTAGES OF THE INVENTION

The present invention describes a system that flags when a drop-out begins and/or ends in a memorized block of data. When used by the block decoder, the flags allows recovery of lost information. The identification of the beginning and/or end of a drop-out ensures that the data is not misinterpreted and employed incorrectly, e.g. in processing a filmstrip having such encoded data recorded in the MOF layer tracks, for example.

BRIEF DESCRIPTION OF THE DRAWINGS

Other objects, advantages and features of the present invention will be readily appreciated as the same becomes better understood by reference to the following detailed description when considered in connection with the accompanying drawings, in which like reference numerals designate like parts throughout the figures thereof and wherein:

FIG. 8 is an alternative embodiment of the invention employing a state machine coupled to the peak detector of FIG. 4 whereby the coded data is decoded and memorized and drop-outs or drop-ins are flagged in memory; and FIG. 9 is a state diagram illustrating the operation of the state machine of FIG. 8.

DETAILED DESCRIPTION OF THE PREFERRED EMBODIMENT

Figure 2:
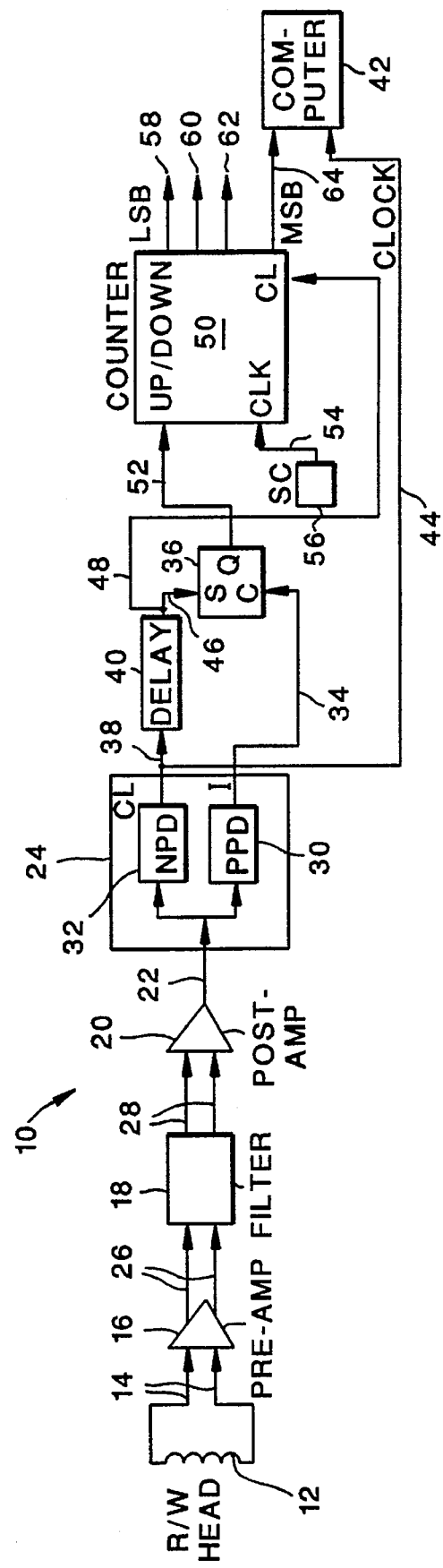
FIG. 2 depicts shows the prior art decoding circuit for decoding data and parity bits in information-cells in blocks of recorded data and parity bytes.

The present invention may be implemented into a system for decoding the Wash, self clocking PPM signal levels in a read out circuit similar to that of FIG. 2 with modifications made to the peak detector 24 and incorporation of the operations of flip-flop 36, delay 40 and counter 50 into a microprocessor-based microcomputer. Turning now to FIGS. 3 and 4, the modified peak detector 64 includes a first PPD and NPD which detect peak signal levels that exceed (in absolute terms) the data and clock thresholds for decoding data and clock pulses and a second PPD and NPD which detect peak signal levels that exceed (in absolute terms) a lower threshold pair for detecting sub-threshold data and clock pulses occurring as the signal level drops out.

Figure 1:
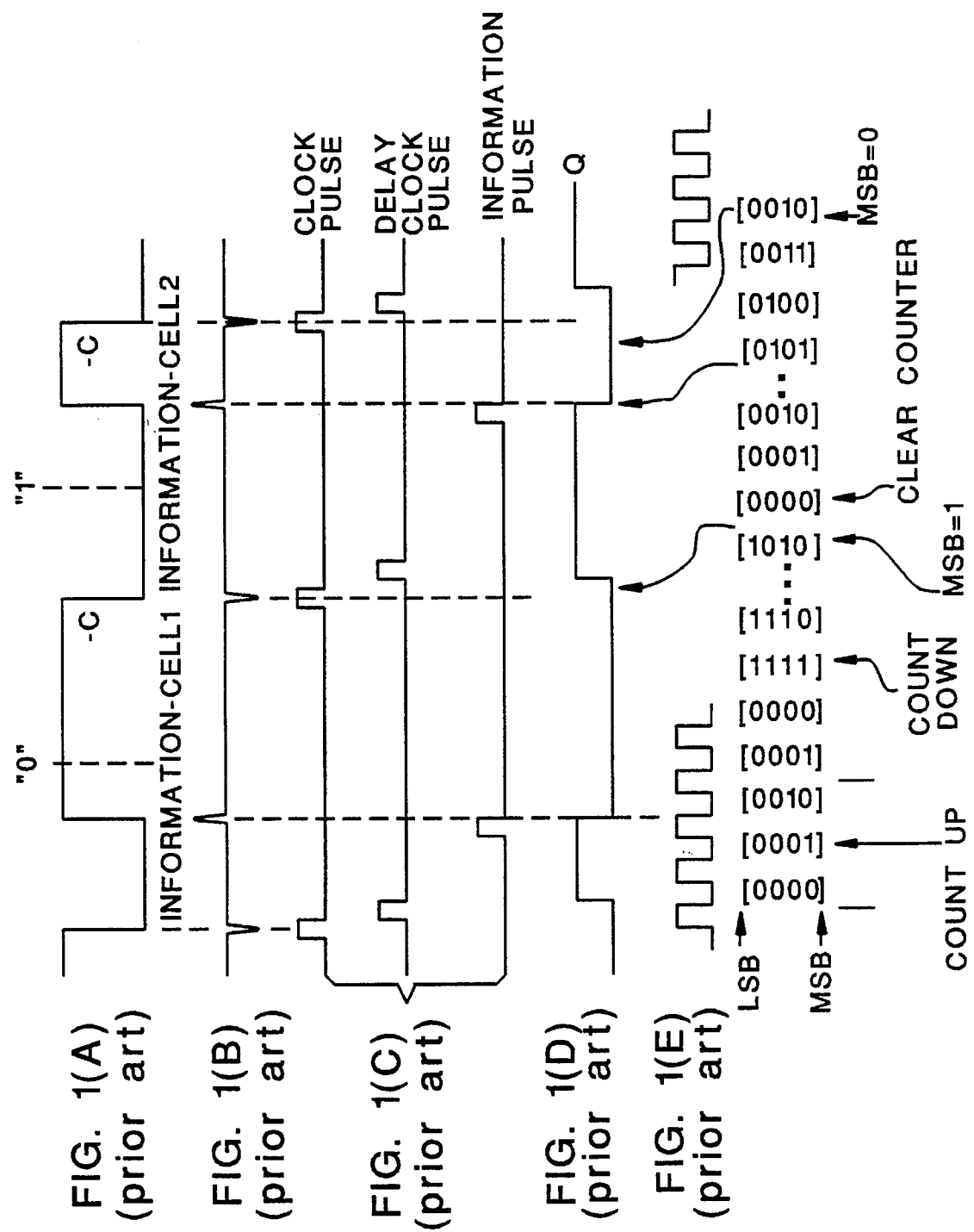
FIGS. 1A–1E are waveform diagrams showing the recorded PPM information-cell clock and data signals of the prior art and the decoding of the data signals therefrom with the circuit of FIG. 2.
Figures 3A, 3B, 3C, 3D, 3E, 3F:
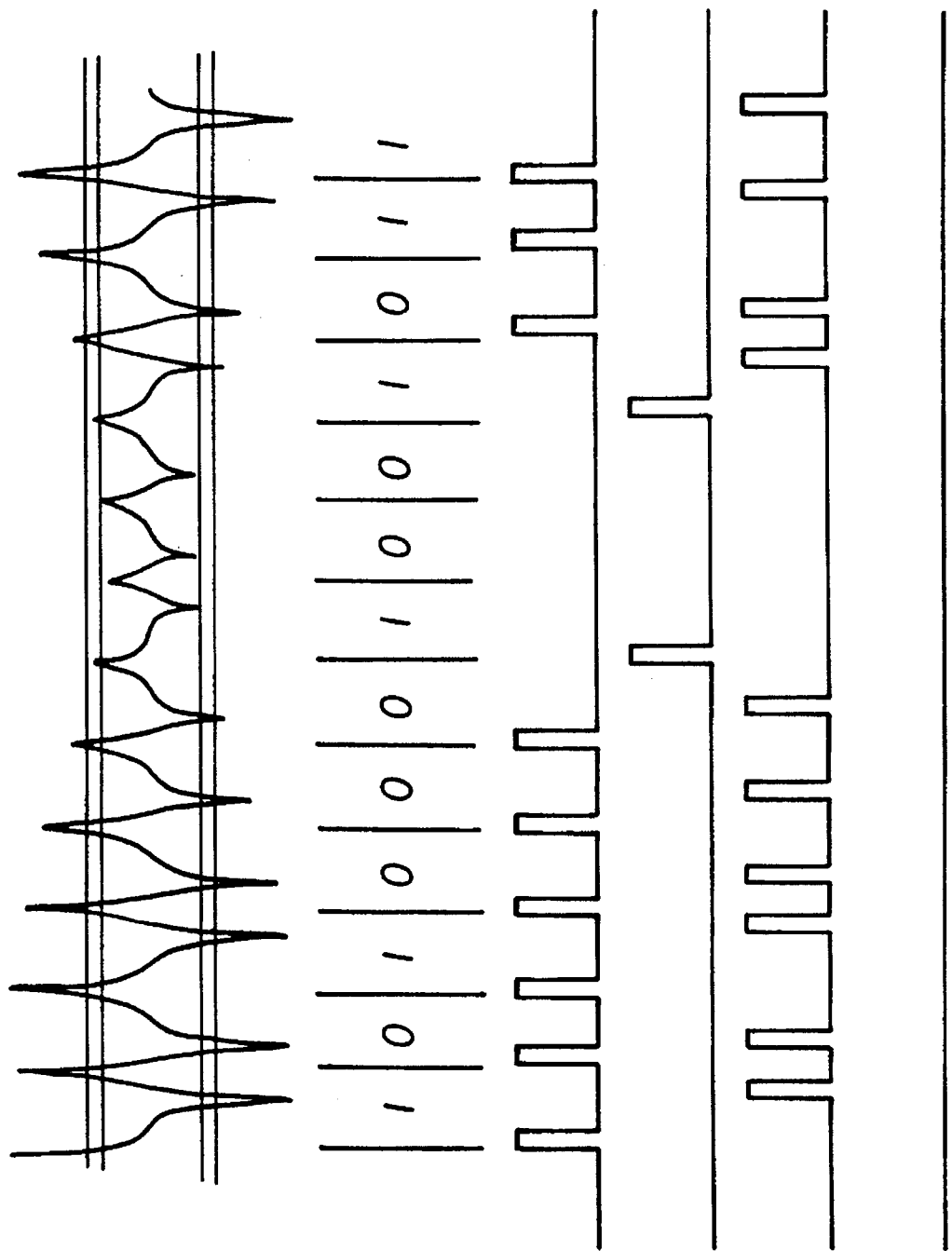
FIG. 3A–3F are waveform diagrams showing the decoding of recorded PPM information-cell clock and data signals and the identification of a drop-out and recover position in the decoded clock and data bit stream of any given block of bytes.
Figure 4:
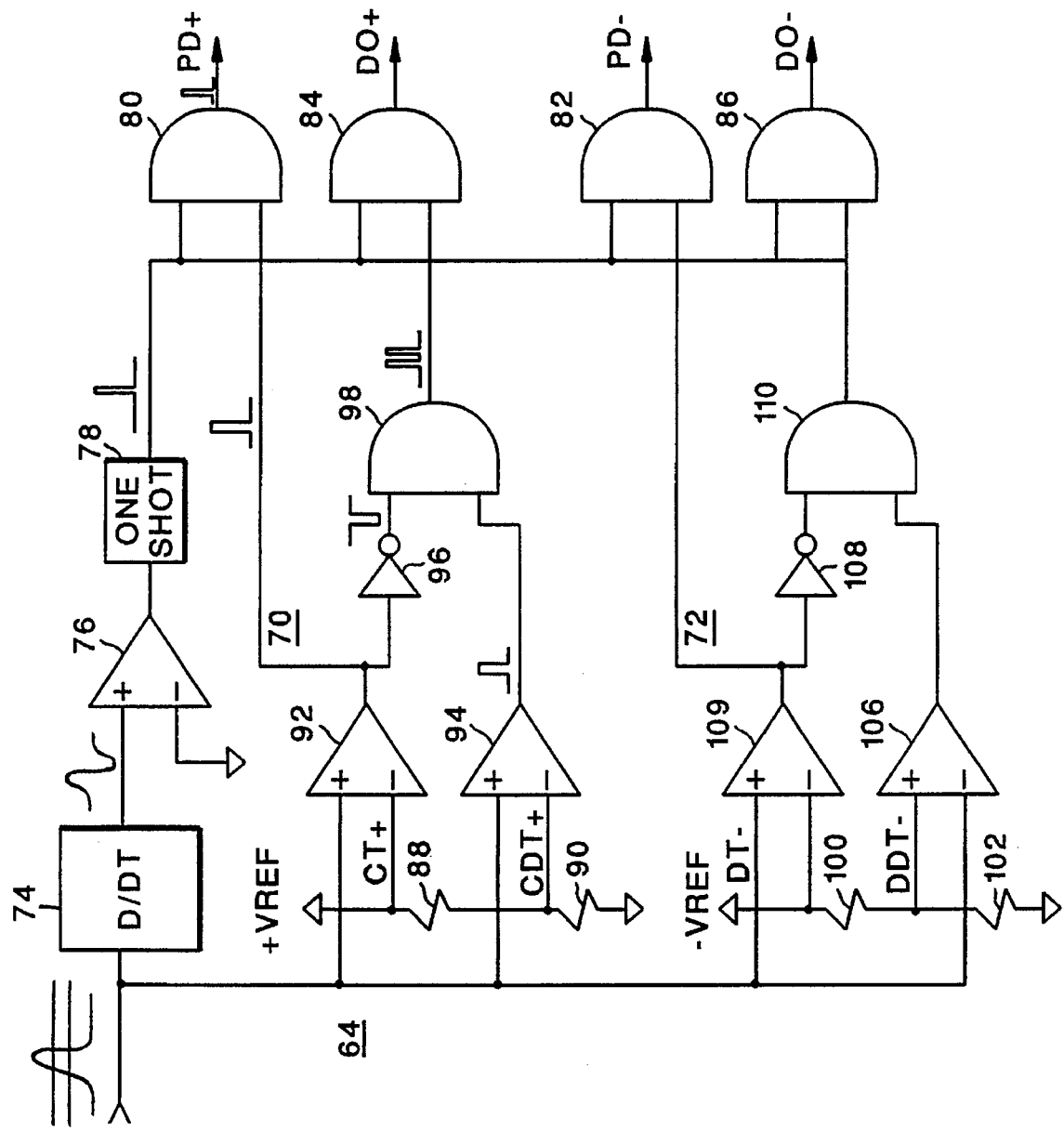
FIG. 4 is a modified peak detector in accordance with the present invention for detecting drop-outs and recovery in information-cells of FIG. 3A.

As shown in FIG. 3A, the pulse signal waveform is inverted from those shown in FIG. 1B, but may be assumed to be equivalent thereto in function and with reversal of designations of the output signals of the PPDs and NPDs. The PPM encoded data bit pattern is identified in FIG. 3B. A drop-out region is evidenced by the loss of amplitude of the pulse peaks.

As also shown in FIG. 3A, the positive clock pulse threshold CT+ is augmented by a lower amplitude, positive clock drop-out pulse threshold CDT+. Similarly, the negative data pulse threshold DT– is augmented by a higher amplitude, negative data drop-out pulse threshold DDT–. Any pulse peaks of the PPM signal falling in the positive or negative threshold ranges between the two sets of clock peak thresholds CT+ and CDT+ or data peak thresholds DDT– and DT– provides drop-out pulses DO+ or DO–, respectively, marking those peaks as bounding a drop-out region (as shown in FIG. 3D for DO+). Positive (clock) and negative (data) pulse peaks exceeding both thresholds are indicated by peak detect pulse trains PD+ and PD– appearing in FIGS. 3C and 3E. In this example, the negative data pulse peaks in the drop-out zone all fall below (in absolute terms) the data drop-out pulse threshold DDT–, and so none appear in FIG. 3F.

The four thresholds are set in the modified peak detector 64 of FIG. 4 by the reference voltages applied to input terminals of the modified PPD 70 and the modified NPD 72 which both receive the signal of FIG. 3A. Differentiator 74, comparator 76, and bi-directional one-shot 78 form a modified peak detector 64 that outputs a timing pulse for each peak in the incoming signal waveform, regardless of polarity and amplitude. It will be understood that differentiator 74 may be replaced by an integrator or a non-linear peak detector of types known in the art having good signal-to-noise discrimination. The incoming signal waveform is applied to positive input terminals of comparators 92 and 94 of the modified PPD 70 and to the negative input terminals of comparators 104 and 106 of the modified NPD 72. The modified PPD 70 and NPD 72 develop the pulse trains PD+ and PD– appearing in FIGS. 3C and 3E at the outputs of AND gates 80 and 82 or the pulse trains DO– and DO+ at the outputs of AND gates 84 and 86, except when the positive and negative signal peaks fall below both thresholds. Given the rise and fall times of the incoming waveform of the positive and negative peaks, it can be expected that the output signals from comparators 94 and 106 will be wider and encompass the duration of the output signals from comparators 92 and 104. The differentiator 74, comparator 76 and one shot 78 are set to output the timing pulse near the positive or negative pulse signal peak such that the timing pulse duration falls within the duration of the output signals from comparators 92 and 104.

First and second positive thresholds are set by the resistor pair 88 and 90 between +Vref and system ground. The positive pulse threshold voltages CT+ and CDT+ developed thereby are applied to the negative input terminals of comparators 92 and 94, respectively. The output signal of comparator 92 is applied to one input of AND gate 80 and to inverter 96, where it is inverted and applied to one input of AND gate 98. The output signal of comparator 94 is applied to the other input of AND gate 98, and the output of AND gate 98 is applied to an input of AND gate 84. The other terminals of AND gates 80 and 84 receive the timing pulse from one-shot 78.

Similarly, the negative threshold range is provided by the resistor pair 100 and 102 between –Vref and system ground. The negative threshold voltages DT– and DDT– developed thereby are applied to the positive input terminals of comparators 104 and 106, respectively. The output signal of comparator 104 is applied to one input of AND gate 82 and to inverter 108, where it is inverted and applied to one input of AND gate 110. The output signal of comparator 102 is applied to the other input of AND gate 110, and the output of AND gate 110 is applied to an input of AND gate 86. The other terminals of AND gates 82 and 86 receive the timing pulse from one shot 78.

Turning to the operation of the modified peak detector 64, comparators 92 and 104 compare the first, upper (absolute value) threshold levels CT+ and DT– for a valid clock or data peak to the incoming read out signal pattern. Comparators 94 and 106 compare the second, lower (absolute value) threshold levels CDT+ and DDT– to the incoming read out signal pattern shown in FIG. 3A. At the same time, the timing pulse is developed from the differentiation and zero crossing detection of the peak magnitude of the read out signal pattern.

Turning for example to the operation of the PPD 70, when a positive, clock peak occurs that exceeds the first and second thresholds CT+ and CDT+ in magnitude, comparators 92 and 94 both go high at the point where their respective thresholds are exceeded. The positive pulse output of comparator 92 and the timing pulse are simultaneously applied to AND gate 80, allowing the peak detect pulse PD+ to be transmitted to the decoder. The inverted pulse from inverter 96 disables AND gate 98 for the duration of the positive pulse output. Consequently, a pair of pulses may be passed by the AND gate 98 and applied to one input of AND gate 84 bracketing the timing pulse. Since the pulses do not overlap, the output of AND gate 84 does not go high and does not provide the drop-out pulse DO+. In this fashion, the decoding of the drop out pulse DO+ is inhibited or negated when the peak magnitude of the read out signal pattern exceeds the first and second thresholds CT+ and CDT+ and the decoding of the valid peak detect pulse PD+ is allowed.

When a positive signal pattern peak magnitude occurs that exceeds only the lower positive threshold CDT+, comparator 94 applies its somewhat narrower high pulse output to AND gate 98 while the other input state is high, resulting in a high output applied to one input of AND gate 84 at the same time that the timing pulse is present at the other input. Therefore, the output of AND gate 84 goes high for the overlapping duration of the two pulses, resulting in the generation of the drop-out signal DO+ applied to the decoder.

The NPD 72 operates in a similar fashion to compare negative going data pulse signals to the third and fourth thresholds DT– and DDT– to develop either the PD– or DO– pulse signals of FIGS. 3E or 3F. Again, the timing pulse generated by one-shot 78 inhibits and negates the passage of drop-out pulse DO– through AND gate 86 when the magnitude of the negative, data peak exceeds the third threshold DT– and the peak detect pulse PD– is passed through gate 82.

It is critical that the second and fourth thresholds CDT+ and DDT– are set such that at least one positive or negative peak will fall in the positive or negative threshold range during either the onset or the end of a drop-out. This range will vary depending on the type of media and head used in the system.

Figure 5:
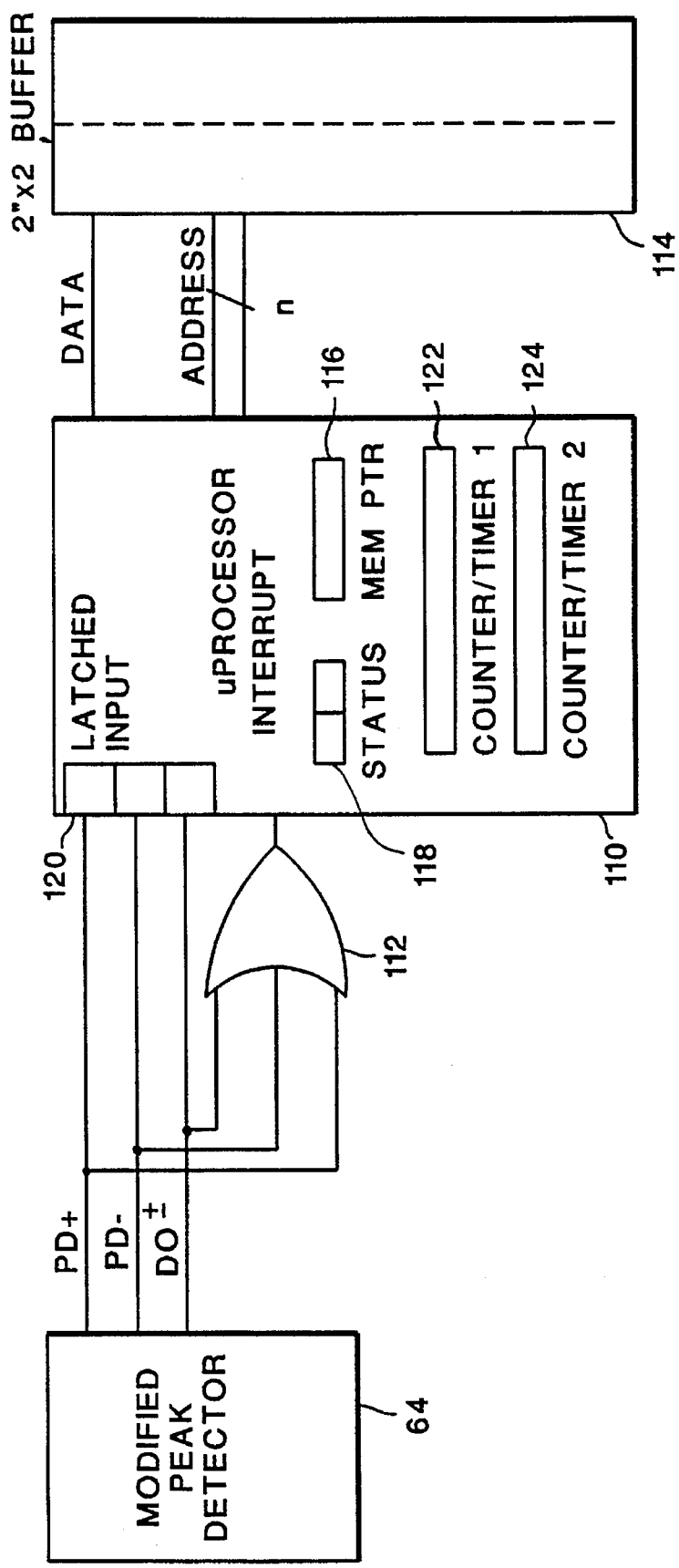
FIG. 5 is a system block diagram of a first embodiment of the invention coupled to the peak detector of FIG. 4 whereby the coded data is decoded and memorized and drop-outs or drop-ins are flagged in memory.
Figure 7:
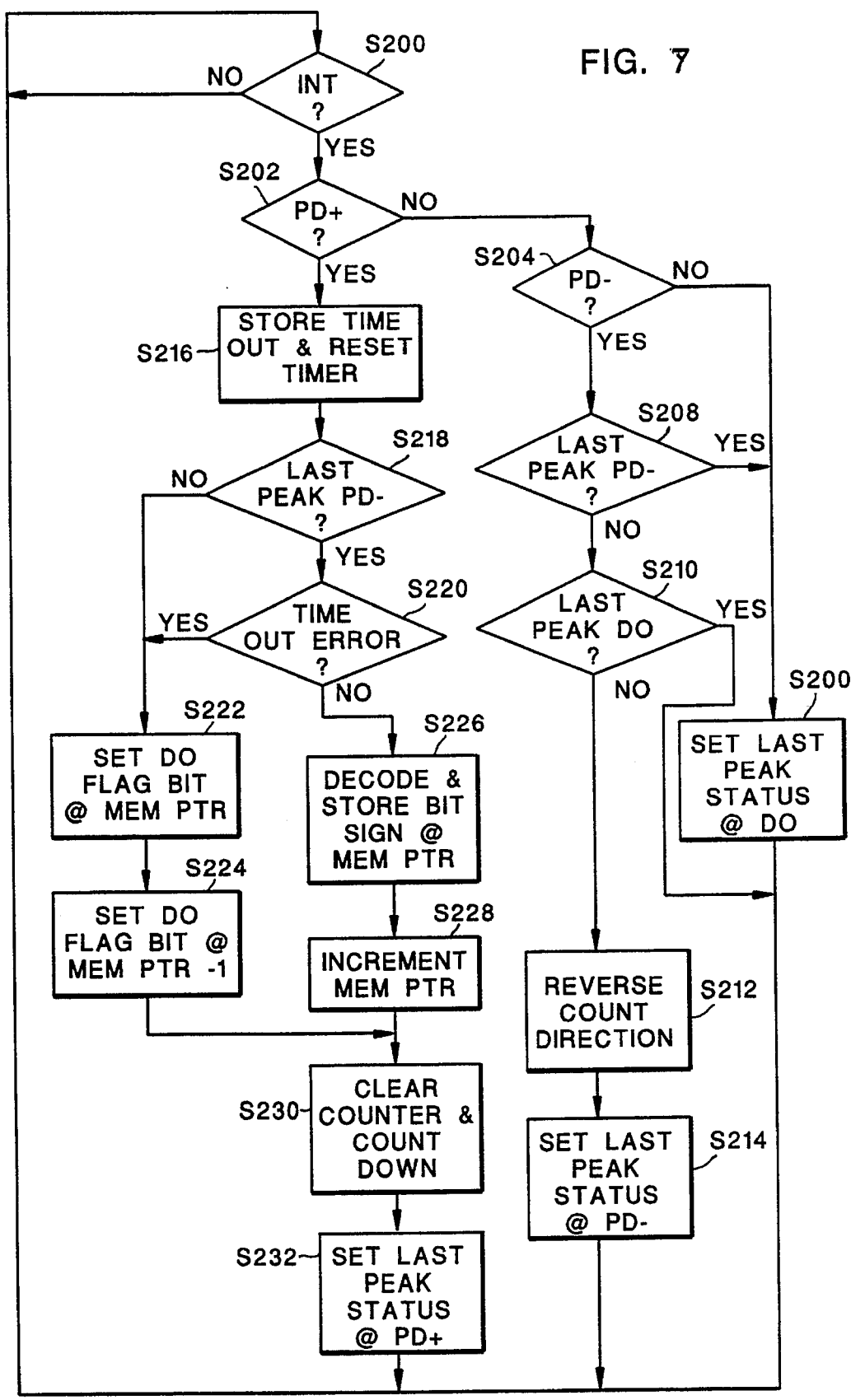
FIG. 7 is a detailed flow chart of the operation of the system of FIG. 5 for detecting drop-outs and drop-ins under a variety of circumstances.

Turning to FIG. 5, it shows a specific implementation of a system for flagging any drop-out pulses DO+ or DO– that are generated by the modified peak detector 64 or drop-ins or drop-outs that elude the detector 64. As described below, the system of FIG. 5 operating as depicted in FIG. 7 may also flag drop-ins or drop-outs from certain sequences of the peak detect pulses PD+ and PD–. In this implementation, the outputs of the AND gates 84 and 86 are combined, and the combined drop-out pulses DO±, as well as the peak detect pulses PD+, PD– from the AND gates 80 and 82, are applied to a latched input 120 of a microprocessor 110. The outputs of the AND gates 80, 82 and 84/86 are also applied to inputs of an OR gate 112 to provide an interrupt signal to tell the microprocessor 110 that one of the drop-out or peak detect pulses has been generated. The microprocessor 110 could also poll the latched input 120 to detect the occurrence of a peak detect pulse PD+, PD– or drop-out pulse DO±.

The microprocessor 110 is programmed to store the most recent to occur of the peak detect pulse +PD, –PD, or drop-out pulse DO± in a 2-bit status register 118 for remembering the most recent pulse type. A first counter/timer 122 for decoding valid PPM data is also provided in the microprocessor 110. The first up/down counter/timer 122 can be cleared to commence down counting and reversed to commence up counting on detection of a peak detect pulse –PD and a +PD, respectively. The count at the detection of a peak detect –PD is employed to decode a 1 or 0 data bit. A second counter timer 124 is also provided for timing out intervals between successive clock peak detect pulses PD+ to detect drop-outs that may abruptly occur and not be detected in the modified peak detector 64 in a manner described below.

The decoded bits are applied on a data line to an n×2 buffer 114 for storing the decoded data results. The buffer 114 could be a small FIFO for temporary storage of results or it could be large enough to hold an entire frame of data. Buffer 114 is two bits wide, because one bit is used for storing data bits and the other is used for storing drop-out flags. The buffer 114 and microprocessor 110 may be combined in a microcomputer, of which many are commercially available.

Microprocessor 110 also has a memory pointer (mem ptr) register 116 which contains the address in the buffer 114 where the next decoded 1 or 0 bit and/or any drop-out or drop-in flag can be written. In view of the fact that the counter/timer 122 may be counting up or down when a drop-out occurs and the count may bear no relation to the real data when the next data peak detect pulse −PD is detected, the DO flags written in with the questionable data bits can be used to identify the drop-outs.

Figure 6:
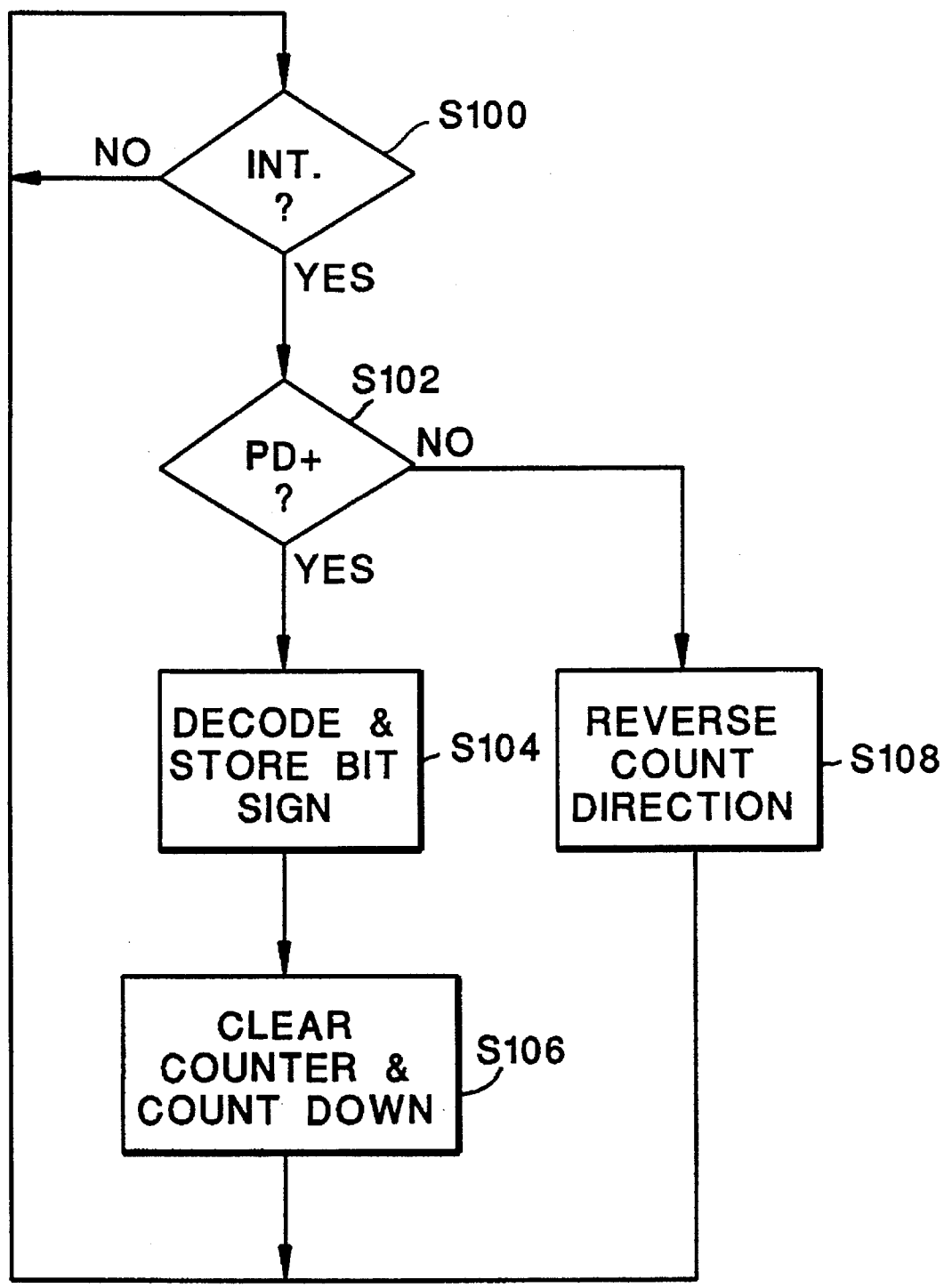
FIG. 6 is a flow chart depicting the general operation of the system of FIG. 5.

The counter/timer 122 of the microprocessor 110 is operated in conjunction with the status bit register 118 to count up or down in a fashion analogous to the operation of the up/down counter 50 of FIG. 2. FIG. 6 is a simplified flow chart of the decoding operation. Each time that a peak is detected in decision step S100, i.e., the interrupt is flagged in FIG. 5, the peak type is determined in decision step S102. If a positive clock peak detect pulse PD+ is at the latched input 120, the 1 or 0 bit sign is decoded as a function of the count in the counter/timer 122 following the decoding principles described above with respect to FIG. 1 and stored in buffer 114 in step S104. Then, in step S106, the count in the counter/timer 122 is cleared and count down is commenced again from the start count.

Alternatively, if a negative data peak detect pulse PD− is at the latched input 120, the counter/timer 122 is reversed in step S108 to count up from the down count value in the counter/timer 122. In this fashion, the resulting count in the counter/timer at the next clock peak detect pulse PD+ determines whether a 1 or 0 is decoded.

Turning to FIG. 7, it is a more detailed flow chart incorporating the drop-out detection and decoding steps of the present invention. In this implementation, DO flag bits are set under a number of possible events, including the receipt of the drop-out DO± after either a peak detect pulse PD+ or PD−, as described above, or due to other indicators of a drop-out or a drop-in. Such indicators include the timeout of too great an interval between successive clock peak detect pulses PD+ indicating a drop-out and the detection of successive peak detect pulses of the same sign indicating a drop-in, if the timeout has not occurred, or a drop-out. Drop-out flags are set upon receipt of the first valid clock peak after an error condition. Moreover, an anticipatory drop-out flag may be recorded adjacent to the valid data bit stored just prior to determination of a drop-out or drop-in.

The flow chart of FIG. 7 commences with steps S200 and S202 corresponding to steps S100 and S102 of FIG. 6. A new path is added for discrimination of drop-out pulses DO± from the peak detect pulses +PD and −PD peaks to set the last peak state to a DO. After steps S200 and S202, and if a −PD is not at the latched input, the decision step S204 determines if a +PD or DO± is at the respective latched input. If a DO± is at its latched input, then the last peak status register 118 is set in step S206 to DO, that is a condition which indicates that a drop-out has occurred since the last good data bit was detected. The count in the counter/timer 122 continues to increment or decrement, and a DO flag is written into buffer 114 at the next positive clock peak detect pulse PD+ as described below.

Alternatively, the status register 118 is used to remember the polarity of the last valid peak detect pulse PD+ or PD− each time one is detected. If a peak detect pulse PD− rather than a DO is at the latched input 120, the status register 118 is queried at decision step S208. If the status register 118 stores a negative data peak detect pulse PD−, then the last peak status register is also set to DO in step S206. If, however, the last peak status register shows that the last peak pulse was not a negative peak detect pulse PD−, it is determined in decision step S210 whether it is storing a drop-out pulse DO. If it is not, then count direction in counter/timer 122 is reversed in step S212 (as in step S108 of FIG. 5), and the last peak status register 118 stores the peak detect pulse PD- in block S214. If it is, then the counter/timer 122 count direction is not reversed, and the peak status register 118 continues to store the drop-out pulse DO. Then, the next interrupt is awaited in step S200.

In this embodiment of the invention, the further timer/counter 124 of microprocessor 110 is operated to time out the intervals between successive clock peak detect pulses PD+ in step S216. The status of timer/counter 124 is checked in the event that the positive, clock peak detect pulse PD+ is at the latched input in step S200. The timer is reset and the time out is stored in step S216, and the status register 118 is checked at step S218. If the last peak was a data peak detect pulse PD−, then the stored time is compared to a reference time related to the nominal clock interval of the information-cell in decision step S220.

If the last peak stored in the status register 118 is not a data peak detect pulse PD−, i.e., a clock peak detect pulse PD+ or a drop-out pulse DO, or if the second counter/timer 124 has a time that exceeds the reference time interval, then a drop-out is presumed to have occurred. The DO flag bit of buffer 114 is set in step S222, and it is stored in buffer 114 at the memory pointer designated stage adjacent to the empty decode data bit stage for the information-cell just ended by the detection of the clock peak detect pulse PD+. Since it would be desirable to flag the last valid data bit in buffer 114, the DO flag bit is set at the preceding memory pointer address in step S224. However, this step S224 need not be included in specific implementations of the algorithm.

Assuming that the last peak detect pulse PD− was stored in the status register 118, and the timer/counter 124 time out was not excessive, it can be assumed that the just ended information-cell was valid. The count in counter/timer 122 is decoded and stored at the address in buffer 114 designated by the memory pointer 116 in step S226, and the memory pointer 116 is incremented to point to the next address in step S228. The counter/timer 122 is cleared and the count down commenced in step S230, as in step S106 of FIG. 6. The last peak status register 118 is again set to the clock peak detect pulse PD+ in step S232, and the interrupt is monitored in step S200.

FIG. 7 thus shows the use of the drop-out pulses DO± to mark the drop-out data bits in the buffer 114. Invalid data bits are not decoded, but the unique drop-out status can be identified. The flow chart also employs other drop-out detectors in steps S216, S220 which could be eliminated from an operative embodiment. Similarly the flow chart shows the detection of successive peak detect pulses PD+ and PD− in steps S218 and S208, successively, which could be eliminated from an operative embodiment. In addition, it shows the flagging of the anticipatory drop-out in step S224 which could also be eliminated from an operative embodiment.

Turning now to FIGS. 8 and 9, an alternative hardware implementation to the microprocessor based system of FIGS. 5–7 is depicted. A state machine 130 is coupled to a buffer or shift register 132 for storing the decoded data bits and/or DO flags in response to the peak detect pulses PD+ and PD− and the drop-out pulses DO± in accordance with the operation of the state diagram of FIG. 9. In FIG. 8, the peak detect pulses PD+ and PD− and the drop-out pulses DO± are applied to clock inputs of flip-flops 136, 138, 140 which are cleared by a common pulse applied to the reset inputs. A clock controls the operation of the state machine 130 and the up/down timer/counter 134 which provides the timing counts for decoding 1 or 0 data bits according to the PPM code described above. A logic 1 is applied to the D inputs of the flip-flops 136, 138, 140 in common in order to set them on receipt of a pulse. The peak detect pulses PD+ and PD− and the drop-out pulses DO± are applied as input states to the state machine 130 as long as the associated flip-flop state is high. A data valid output is provided to notify succeeding circuitry that a valid data bit is available, that is, that a valid data bit has been shifted to the output of the shift register 132. The data and any drop-out flags are then shifted to a further register of the microprocessor-based system for data decoding and further processing.

The state machine 130 has four states with interconnected transitions and actions associated with the transitions designated A-H as shown in FIG. 9. Three primary states are designated by the state of the flip-flop inputs corresponding to the last received of the peak detect pulses PD+ and PD− and the drop-out pulse DO±. A fourth interim state "I" provides a delay so that the decoded bit in the MSB stage of counter 134 can be stored into the shift register 132 before it is shifted out. The input vector for each depicted state transition is —PD+, PD−, DO—, which may be 000, 001, 010, or 100 for each depicted state transition. The state during the transition from the interim I state to the PD− state is immaterial and is designated "XXX". The input vector 000 is effected by the reset of the transitions. The transition actions are stated as follows:

| | |
|---|---|
| A | Clear input vector |
| B | Set shift register 132 DO bit |
| C | Clear counter 134 |
| D | Set counter 134 count direction to Down |
| E | Set counter 134 count direction to Up |
| F | Output data valid pulse |
| G | Load counter sign bit to SR 132 data bit |
| H | Shift out |

Each of these actions can be traced on FIG. 9 in reference to FIG. 8. After the input vector is reset to 000, all three primary states remain stable in the absence of a changed input vector. For example, in the normal operation, the PD+ state and the PD− state alternate as the input vectors switch between 100 and 010. At each 100 input vector while in the PD− state, the input vector is reset (A), and the count direction is set to Up (E); the state then shifts to PD+. At each 010 in the PD+ state, the input vector is reset (A), the counter 134 sign bit is loaded to the shift register 132 data bit (G), the counter 134 is reset (C), and the count direction is set to Down (D). The transition to the PD− state is delayed at interim state I while the output data valid pulse is generated (F) and the shift out (H) takes place. However, if the PD-state is followed by a 010 input vector, the counter sign bit is not loaded, and the shift register DO bit is set (B). No state change occurs.

If the PD+ state is followed by a DO input vector (001) or a succeeding PD+ input vector (100), the input vector is reset, and the state is changed to DO. The DO state can only be exited by an input vector 010 back to the PD− state. The transition is accompanied by the input vector being reset (A), the shift register 132 being set to the DO bit (B), the counter 134 being cleared (C), and the count direction being set to Down (D).

In a manner well known in the art, the state machine 130 can be implemented to follow these states.

The invention as described above is usable in any form of magnetic or optical recording or the like on any medium. Moreover, it may be used in any type of peak recording data coding other than the above described, NRZ or NRZI PPM code. A number of advantages flow as a result of being able to detect the onset of a drop-out and/or the recovery or drop-in peak. Frequently, drop-outs of just a few bits occur, typically because of a momentary loss of contact of the head with the magnetic media as described above. In a typical clocked code, the number of missing bits can be determined. Once the number of bits are determined, the location in the stream of bytes can be determined.

In certain data recording formats, the bytes of a data block are redundantly recorded, and the bytes located thereby having the drop-out bits can be ignored in favor of the back-up bytes. In other data recording formats, e.g. the format depicted above in Tables I and II, the corrupted data byte may be reconstituted from the LRC and the byte parity bits $P_1 \ldots P_n$.

From Table II above, it will be recalled that a drop-out of three information-cells and the respective data bits $d_{25}$, $d_{26}$, $d_{27}$, occurred in the second row, causing the data bytes and the LRC parity bits to shift in the recovered block. In Table II, reproduced below, the DO code appears at the onset of the drop-out in relation to the missing bit locations:

| Corrupted Data | | | | | | | |
|---|---|---|---|---|---|---|---|
| $P_1$ | $d_{11}$ | $d_{12}$ | $d_{13}$ | $d_{14}$ | $d_{15}$ | $d_{16}$ | $d_{17}$ |
| $P_2$ | $d_{21}$ | $d_{22}$ | $d_{23}$ | $d_{24}$ | $P_3$ | $d_{31}$ | $d_{32}$ |
| $d_{33}$ | $d_{34}$ | $d_{35}$ | $d_{36}$ | $d_{37}$ | P | P | P |
| P | P | P | P | P | X | X | X |

It will be understood that a DO flag bit is associated with the positions corresponding to data bit $d_{24}$ and $P_3$ in the parallel bit-stage of the shift register 132 of FIG. 8 or the buffer 114 of FIG. 5. The bits following the drop-out code DO may be shifted in Table IV until the parity bits of the parity column and data columns 1–4 are correct:

| Shifted Data | | | | | | | |
|---|---|---|---|---|---|---|---|
| $P_1$ | $d_{11}$ | $d_{12}$ | $d_{13}$ | $d_{14}$ | $d_{15}$ | $d_{16}$ | $d_{17}$ |
| $P_2$ | $d_{21}$ | $d_{22}$ | $d_{23}$ | $d_{24}$ | X | X | X |
| $P_3$ | $d_{31}$ | $d_{32}$ | $d_{33}$ | $d_{34}$ | $d_{35}$ | $d_{36}$ | $d_{37}$ |
| P | P | P | P | P | P | P | P |

Since the LRC parity bits for the three columns 5, 6, 7 and the row parity bit P2 are now known, and since the other data bits in columns 5, 6, 7 are also known, the missing data bits $d_{25}$, $d_{27}$, $d_{27}$, can be reconstituted.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–8 read circuit 10
read/write magnetic head 12
lines 14, 26, 28
pre-amplifier 16
filter 18
post-amplifier 20
line 22, 34, 38, 44, 46, 48, 52, 54, 58, 60, 62, 64 peak detector 24
positive peak detector (PPD) 30
negative peak detector (NPD) 32
flip-flop 36
delay circuit 40
computer 42
up/down counter 50
system clock 56
modified peak detector 64
modified PPD 70
modified NPD 72
differentiator 74
comparator 76
bi-directional one-shot 78
AND gates 80, 82, 84, 86, 98, 110
positive threshold resistor pair 88 and 90
comparators 92, 94, 104, 106
inverter 96
negative threshold resistor pair 100 and 102
microprocessor 110
NOR gate 112
buffer 114
memory pointer 116
status register 118
latched inputs 120
first up/down counter/timer 122
second up/down counter/timer 124
state machine 130
shift register 132
up/down counter 134
flip-flop 136, 138, 140

I claim:

1. A method of decoding data from positive and negative pulses of an encoded pulse train, wherein the encoded pulse train is subject to drop-outs and drop-ins, the method comprising the steps of:

providing positive and negative peak pulse thresholds;

comparing the magnitudes of positive and negative pulses to said positive and negative peak pulse thresholds;

decoding data bits from valid positive and negative pulses exceeding said positive and negative peak pulse thresholds;

identifying drop-outs in the encoded pulse train as a function of read out positive and negative pulse magnitudes not exceeding said positive and negative thresholds and providing drop-out flags indicating a gap in data bits;

storing decoded data in memory locations;

storing the drop-out flags in memory locations in relation to decoded data such that the beginning and/or end of a drop-out in the encoded pulse train is indicated; and identifying drop-outs or drop-ins in the encoded pulse train in response to the occurrence of two successive valid positive pulses or two successive valid negative pulses in the pulse train.

2. The method of claim 1 wherein the identifying step further comprises the additional steps of:

timing out the interval between successive valid positive or negative pulses;

providing a reference interval;

comparing the timed out interval to the reference interval; and identifying drop-outs in the encoded pulse train in response to the timed out interval exceeding the reference interval.

3. The method of claim 1 wherein the identifying step further comprises the additional steps of:

timing out the interval between successive valid positive or negative pulses;

providing a reference interval;

comparing the timed out interval to the reference interval; and identifying drop-outs in the encoded pulse train in response to the timed out interval exceeding the reference interval.

4. The method of claim 1 wherein the drop-out flag storing step further comprises the steps of:

identifying the preceding data stored decoded data location in memory; and storing the drop-out flag in a memory location in relation to the identified preceding decoded data location such that the last valid data prior to the beginning of the drop-out in the encoded pulse train is indicated.

5. Apparatus for decoding data from positive and negative pulses of an encoded pulse train, wherein the encoded pulse train is subject to drop-outs and drop-ins, the apparatus further comprising:

means for providing positive and negative peak pulse thresholds;

means for comparing the magnitudes of positive and negative pulses to said positive and negative peak pulse thresholds;

means for decoding data bits from valid positive and negative pulses exceeding said positive and negative peak pulse thresholds;

means for identifying drop-outs in the encoded pulse train as a function of read out positive and negative pulse magnitudes not exceeding said positive and negative thresholds and providing drop-out flags indicating a gap in data bits;

means for storing decoded dam in memory locations;

means tier storing the drop-out flags in memory locations in relation to decoded data such that the beginning and/or end of a drop-out in the encoded pulse train is indicated; and means for identifying drop-outs or drop-ins in the encoded pulse train in response to the occurrence of two successive valid positive pulses or two successive valid negative pulses in the pulse train.

6. The apparatus of claim 5 wherein the identifying means further comprises:

means for timing out the interval between successive valid positive or negative pulses;

means for providing a reference interval;

means for comparing the timed out interval to the reference interval; and means for identifying drop-outs in the encoded pulse train in response to the timed out interval exceeding the reference interval.

7. The apparatus of claim 5 wherein the identifying means further comprises:

means for timing out the interval between successive valid positive or negative pulses;

means for providing a reference interval;

means for comparing the timed out interval to the reference interval; and means for identifying drop-outs in the encoded pulse train in response to the timed out interval exceeding the reference interval.

8. The apparatus of claim 5 wherein the drop-out flag storing means further comprises:

means for identifying the preceding data stored decoded data location in memory; and means for storing the drop-out flag in a memory location in relation to the identified preceding decoded data location such that the last valid data prior to the beginning of the drop-out in the encoded pulse train is indicated.

9. A method of decoding data from read out clock and data pulses of a PPM encoded pulse train, wherein successive clock pulses define information-cells and data bits are defined by the position of data pulses within the information-cell, and wherein the encoded pulse train is subject to drop-outs and drop-ins, the method comprising the steps of:

providing clock and data peak thresholds;

comparing the magnitudes of clock and data pulses to said clock and data thresholds and defining valid clock and peak detect pulses;

decoding data bits from valid clock and data peak detect pulses exceeding said clock and data thresholds;

identifying drop-outs in the PPM encoded pulse train as a function of read out clock and data pulses not exceeding said clock and data thresholds and providing drop-out flags in lieu of the respective clock and data pulses;

storing decoded data in memory locations; and storing the drop-out flags in memory locations in relation to decoded data such that the beginning and/or end of a drop-out in the PPM encoded pulse train is indicated.

10. The method of claim 9 wherein the identifying step further comprises the additional step of:

identifying drop-outs or drop-ins in the PPM encoded pulse train in response to the occurrence of two successive valid clock pulses or two successive valid data pulses in the pulse train and providing a drop-out flag in response thereto.

11. The method of claim 10 wherein the identifying step further comprises the additional steps of:

timing out the information-cell interval between successive clock pulses;

providing a reference information-cell interval;

comparing the timed out information-cell interval to the reference information-cell interval; and identifying drop-outs in the PPM encoded pulse train in response to the timed out information-cell interval exceeding the reference information-cell interval and providing a drop-out flag in response thereto.

12. The method of claim 9 wherein the identifying step further comprises the additional steps of:

timing out the information-cell interval between successive clock pulses;

providing a reference information-cell interval;

comparing the timed out information-cell interval to the reference information-cell interval; and identifying drop-outs in the PPM encoded pulse train in response to the timed out information-cell interval exceeding the reference information-cell interval and providing a drop-out flag in response thereto.

13. The method of claim 9 wherein the drop-out flag storing step further comprises the steps of:

identifying the preceding data stored decoded data location in memory; and storing the drop-out flag in a memory location in relation to the identified preceding decoded data location such that the last valid data prior to the beginning of the drop-out in the PPM encoded pulse train is indicated.

14. Apparatus for decoding data from read out clock and data pulses of a PPM encoded pulse train, wherein successive clock pulses define information-cells and data bits are defined by the position of data pulses within the information-cell, and wherein the encoded pulse train is subject to drop-outs and drop-ins, the apparatus comprising:

means for providing clock and data peak thresholds;

means for comparing the magnitudes of clock and data pulses to said clock and data thresholds and defining valid clock and peak detect pulses;

means for decoding data bits from valid clock and data peak detect pulses exceeding said clock and data thresholds;

means for identifying drop-outs in the PPM encoded pulse train as a function of read out clock and data pulses not exceeding said clock and data thresholds and providing drop-out flags in lieu of the respective clock and data pulses;

means for storing decoded data in memory locations; and means for storing the drop-out flags in memory locations in relation to decoded data such that the beginning and/or end of a drop-out in the PPM encoded pulse train is indicated.

15. The apparatus of claim 14 wherein the identifying means further comprises:

means for identifying drop-outs or drop-ins in the PPM encoded pulse train in response to the occurrence of two successive valid clock pulses or two successive valid data pulses in the pulse train and providing a drop-out flag in response thereto.

16. The apparatus of claim 15 wherein the identifying means further comprises:

means for timing out the information-cell interval between successive clock pulses;

means for providing a reference information-cell interval;

means for comparing the timed out information-cell interval to the reference information-cell interval; and means for identifying drop-outs in the PPM encoded pulse train in response to the timed out information-cell interval exceeding the reference information-cell interval and providing a drop-out flag in response thereto.

17. The apparatus of claim 14 wherein the identifying means further comprises:

means for timing out the information-cell interval between successive clock pulses;

means for providing a reference information-cell interval;

means for comparing the timed out information-cell interval to the reference information-cell interval; and means for identifying drop-outs in the PPM encoded pulse train in response to the timed out information-cell interval exceeding the reference information-cell interval and providing a drop-out flag in response thereto.

18. The apparatus of claim 14 wherein the drop-out flag storing means further comprises:

means for identifying the preceding data stored decoded data location in memory; and means for storing the drop-out flag in a memory location in relation to the identified preceding decoded data location such that the last valid data prior to the beginning of the drop-out in the PPM encoded pulse train is indicated.

* * * * *